United States Patent [19]

Goswami

[11] Patent Number: 4,560,618

[45] Date of Patent: * Dec. 24, 1985

[54] BUILDING/VAPOR BARRIER COMBINATION

[75] Inventor: Jagadish C. Goswami, New York, N.Y.

[73] Assignee: Stauffer Chemical Company, Westport, Conn.

[*] Notice: The portion of the term of this patent subsequent to Apr. 3, 1996 has been disclaimed.

[21] Appl. No.: 407,376

[22] Filed: Aug. 12, 1982

Related U.S. Application Data

[63] Continuation of Ser. No. 196,886, Oct. 14, 1980, abandoned, Continuation of Ser. No. 957,389, Nov. 3, 1978, abandoned.

[51] Int. Cl.[4] .................... E04B 5/00; E04B 2/00; B32B 27/00; C08F 230/02
[52] U.S. Cl. ............................ 428/500; 52/303; 52/309.1; 52/404; 52/408; 428/518; 428/522; 524/547; 526/278
[58] Field of Search ............ 524/547; 526/278; 428/500, 518, 522

[56] References Cited

U.S. PATENT DOCUMENTS

| | | | |
|---|---|---|---|
| 3,141,858 | 7/1964 | Fasold et al. | 260/23 |
| 3,872,041 | 3/1975 | Koerber | 524/568 |
| 3,983,290 | 9/1976 | Elcik | 428/522 |
| 4,117,641 | 10/1978 | Wells | 52/489 |
| 4,147,853 | 4/1979 | Goswami et al. | 526/278 |

OTHER PUBLICATIONS

"Building Construction Handbook", Merritt Ed., 2nd Ed. (18-7)(18-9).

Primary Examiner—Herbert J. Lilling
Attorney, Agent, or Firm—Richard P. Fennelly

[57] ABSTRACT

Film forming compositions are disclosed which can be utilized to make vapor barrier films having low water vapor transmission, good flame retardancy and low smoke generation characteristics. The compositions of the present invention contain an internally plasticized vinyl chloride copolymer resin as a major polymer component, rather than an externally plasticized vinyl chloride polymer, or a blend of a vinyl chloride polymer and chlorinated polyethylene.

6 Claims, No Drawings

BUILDING/VAPOR BARRIER COMBINATION

This application is a continuation of U.S. Ser. No. 196,886, filed Oct. 14, 1980, which is a continuation of U.S. Ser. No. 957,389, filed Nov. 3, 1978, now abandoned.

BACKGROUND OF THE INVENTION

1. Field of the Invention

The present invention relates to film forming compositions which can be utilized to make vapor barrier films suitable for use in building construction.

2. Description of the Prior Art

Vapor barrier films are specialized products which are commonly used in building construction to retard the transmission of water vapor into or from the interior of the building. They should have a balance of the following characteristics: a low water vapor transmission value; good flame retardancy and low smoke generation properties; good low temperature flexibility; good tensile and tear strength; and easy processability for such forming operations as calendering, extrusion casting, extrusion blow molding, and solvent casting.

One approach to making such films has been the use of an externally plasticized vinyl chloride polymer resin as the polymer component of such films in conjunction with appropriate amounts of flame retardants, fillers, lubricants, stabilizers, and the like (e.g., see Film No. 1 in Table 1 of U.S. Pat. No. 3,983,290 to R. G. Elcik). Although such films show resistance to water vapor transmission, the presence of externally added plasticizer gives rise to the possibility of plasticizer migration and resulting embrittlement of the product with the passage of time.

Another approach to forming such films has been to incorporate chlorinated polyethylene in the polymer component, along with the vinyl chloride polymer, in an effort to reduce the amount of plasticizer needed in the composition. The presence of plasticizer is believed to contribute to water vapor transmission in vapor barrier films (see, *Kogyo Kagaku Zasshi*, Vol. 64, 349–355 (1961), abstracted in *Chem. Abstr.*, Vol. 57, 4875 f). Some recent examples of vapor barrier film constructions of this type are shown in: U.S. Pat. No. 3,983,290 to R. G. Elcik; copending U.S. Ser. No. 694,271, filed June 9, 1976, to R. G. Elcik and its corresponding issued Belgian Pat. No. 855,443; and U.S. Pat. No. 3,972,041 to M. A. Koerber.

SUMMARY OF THE PRESENT INVENTION

The present invention is a film forming composition which can be utilized to make vapor barrier films having low water vapor transmission, good flame retardance, and low smoke generation characteristics, said completion comprising an internally plasticized vinyl chloride resin which is effective to produce such effects in such a composition. A preferred internally plasticized resin for use in such a composition comprises from about 50% to about 85%, by weight, vinyl chloride, from about 3% to 47%, by weight, of a $C_6$-$C_{10}$ alkyl acrylate, and from about 47% to about 3%, by weight, of a bis(hydrocarbyl)vinylphosphonate.

DESCRIPTION OF PREFERRED EMBODIMENTS

The film forming composition of the present invention typically comprises the following components:

(a) from about 40% to about 70%, by weight of the composition, of a polymer component comprising a predominant amount, for example, in excess of about 45%, by weight of the polymer component, of an internally plasticized resin, which will be described in greater detail below;

(b) from about 0% to about 35%, by weight of the composition, of at least one filler material;

(c) from about 1% to about 15%, by weight of the composition, of at least one flame retardant; and (d) from about 5% to about 35%, by weight of the composition, of at least one functional additive selected from the group consisting of the heat and ultraviolet stabilizers, lubricants, processing aids, and the like.

The major component of the film forming composition is a polymer component which comprises a predominant amount, e.g., in excess of about 45%, by weight, of an internally plasticized resin, which, when combined in an effective amount with the other ingredients of said composition, yields a composition which can be used to form a film having such characteristics as: low water vapor transmission, good flame retardancy and low smoke generation; and good low temperature flexibility.

One preferred internally plasticized vinyl chloride resin for use in the present invention is a copolymer of: (1) from about 50% to about 85%, by weight of the copolymer, of vinyl chloride; (2) from about 3% to about 47%, by weight of the copolymer, of a $C_6$-$C_{10}$ alkyl acrylate; and (3) from about 47% to about 3%, by weight of the copolymer, of a bis(hydrocarbyl)vinylphosphonate.

Representative $C_6$-$C_{10}$ alkyl acrylates which can be used in forming the internally plasticized resin which can be used in the compositions of the present invention include: n-hexyl acrylate, n-octyl acrylate, 2-ethylhexyl acrylate, and mixtures of the foregoing acrylates. The $C_8$-$C_{10}$ alkyl acrylates are preferred for use, especially those containing branched alkyl groups, for example, 2-ethylhexyl acrylate, since such branched alkyl groups give better physical properties (e.g., low temperature flexibility and good tensile strength) to the resulting composition containing the copolymer.

The terminology "bis(hydrocarbyl)vinylphosphonate", as used in the present specification, is meant to encompass vinylphosphonates having the formula:

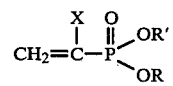

where X is selected from the group consisting of hydrogen, halogen, cyano, aryl, such as phenyl, $C_1$-$C_{18}$ alkyl and

where R and R' are hydrocarbyl and substituted hydrocarbyl groups consisting essentially of hydrogen and carbon, and containing up to about 18 carbon atoms, inclusive, with the proviso that R and R' may be the same, different or conjoint, i.e., R and R' may combine to form one single radical.

The use, in this disclosure, of the expression "hydrocarbyl" and "substituted hydrocarbyl groups" in the definition of the suitable bis(hydrocarbyl)vinylphosphonates refers to the radicals obtained upon the removal of a hydrogen atom from a hydrocarbon group or substituted hydrocarbon group, which may be either an aliphatic or aromatic group. These hydrocarbyl groups may be substituted with any non-interferring groups, i.e., with any group which does not interfere with the polymerization of the bis(hydrocarbyl)vinylphosphonate. Such substituent groups include, for example, chloro, bromo, fluoro, nitro, hydroxy, sulfone, ethoxy, methoxy, nitrile, ether, ester, and ketone groups.

Illustrative of the aliphatic and aromatic groups as represented by R and R' in the above-described structure of the bis(hydrocarbyl)vinylphosphonate are alkyl groups, such as methyl, ethyl, propyl, butyl, pentyl, hexyl, nonyl, and the like; alkenyl groups, such as pentenyl and hexenyl, including all of their respective isomers; cycloalkyl groups, such as cyclopropyl, cyclobutyl, cyclopentyl, cyclohexyl, and the like; cycloalkenyl groups, such as cyclohexenyl, and the like; and aryl groups, such as, phenyl, benzyl, phenethyl, tolyl, naphthyl, and the like.

Representative of the above-defined bis(hydrocarbyl)vinylphosphates are:
Bis(beta-chloroethyl)vinylphosphonate;
Bis(2-ethylhexyl)vinylphosphonate;
Bis(beta-chloropropyl)vinylphosphonate;
Bis(beta-chloroethyl) 1-methylvinylphosphonate;
Bis(beta-chloroethyl) 1-cyanovinylphosphonate;
Bis(beta-chloroethyl) 1-chlorovinylphosphonate;
Bis(beta-chloroethyl) 1-phenylvinylphosphonate;
Dimethyl vinylphosphonate;
Diethyl vinylphosphonate;
Bis(omega-chlorobutyl)vinylphosphonate;
Di-n-butyl vinylphosphonate;
Di-isobutyl vinylphosphonate;
Bis(2-chloroisopropyl) 1-methylvinylphosphonate;
Diphenyl vinylphosphonate; and
Bis(2,3-dibromopropyl)vinylphosphonate From the above group of bis(hydrocarbyl)vinylphosphonate monomers, it is preferred to employ bis(beta-chloroethyl)vinylphosphonate in preparing the internally plasticized polymers used in the compositions of the present invention, since this monomer is a commercially available material and is currently lower in cost than any of the other bis(hydrocarbyl)vinylphosphonates. Bis(2-ethylhexyl)vinylphosphonate is also a preferred monomer since it gives a vinyl film having good flexibility even at very low temperatures.

Compatible mixtures of the respective alkyl acrylates and of the vinylphosphonates can be used, if desired.

One preferred copolymer for use in the compositions of the present invention, from the standpoint of cost and performance, is a terpolymer containing from about 55% to about 80%, by weight, of the copolymer of vinyl chloride, from about 10% to about 35%, by weight, of the $C_6$–$C_{10}$ alkyl acrylate, and from about 25% to about 5%, by weight, of a bis($C_1$–$C_{12}$ haloalkyl)vinylphosphonate copolymerized therein. One terpolymer which can be used to form films having a Shore "A" hardness of from about 60 to about 75 contains from about 56% to about 58%, by weight, of vinyl chloride, from about 29% to about 31%, by weight, 2-ethylhexyl acrylate, and from about 11% to about 13%, by weight, of the vinylphosphonate, e.g., of bis(beta-chloroethyl)vinylphosphonate or of bis(2-ethylhexyl)vinylphosphonate. For a harder film having a Shore "A" hardness of from about 80 to about 90, a higher vinyl chloride content is needed. This is easily accomplished by raising the vinyl chloride monomer content and correspondingly reducing the acrylate and vinylphosphonate monomer content in the polymerization reaction. For example, a terpolymer having a Shore "A" hardness of from about 85 to about 95 can contain from about 73% to about 75%, by weight, vinyl chloride, from about 17% to about 19%, by weight, of the $C_6$–$C_{10}$ alkyl acrylate, e.g., 2-ethylhexyl acrylate, and from about 7% to about 9%, by weight of the bis(hydrocarbyl)vinylphosphonate, e.g., bis(beta-chloroethyl)vinylphosphonate. Terpolymers having a Shore "A" hardness of from about 85 to about 95 are particularly preferred for use in the compositions of the present invention when calendering is to be used to form the desired vapor barrier film.

The type of internally plasticized copolymer, described above, which is useful in the compositions of the present invention can be formed using conventional bulk, emulsion, suspension, and solution polymerization procedures. Suspension polymerization is preferred since it avoids the problems of isolation of the product from the latex that is produced using emulsion polymerization techniques, the heat of reaction is more readily removed as compared to bulk polymerization procedures, and no solvent recovery is needed as in the solution polymerization.

Suspension polymerization reaction mixtures comprise from about 20% to about 45%, by weight, based on the amount of water, of the above-enumerated monomers in an aqueous reaction medium. Also included are from about 0.05% to about 5%, by weight, based on the weight of monomers, of a suspending agent, such as methyl cellulose, hydroxypropyl methyl cellulose, gelatine, and the like; from about 0.005% to about 1%, by weight, based on the amount of monomer, of at least one monomer-soluble initiator, such as azobisisobutyronitrile, lauroyl peroxide, benzoyl peroxide, or isopropyl peroxydicarbonate. The polymerization reaction is conducted by heating the reaction medium containing the above components to a sufficient temperature and for a sufficient length of time, e.g., from about 35° C. to about 75° C. for about 12 hours, to affect the desired polymerization, with agitation being applied throughout the course of the reaction. As is well known in the art, the use of the more active of the above-mentioned initiators will require use of either a lower temperature or shorter reaction time, or both, whereas use of a less active initiator may require more vigorous reaction conditions. If desired, the molecular weight of the polymers can be regulated by adding an effective amount of a chain transfer agent during the polymerization. Generally from about 0.01 to about 0.1%, by weight of the monomers, of the chain transfer agent can be added, if desired. Representative chain transfer agents include the chlorinated hydrocarbons, e.g., tetrachloroethane, trichloroethane and carbon tetrachloride, and mercaptans of the formula RSH, where R is an alkyl group, e.g., a $C_1$–$C_{12}$ alkyl group, such as butyl or dodecyl.

If emulsion polymerization is to be employed, the above-described suspending agent is replaced with from about 0.2% to about 2%, by weight, of an emulsifying agent, such as sodium lauryl sulfate, potassium stearate, an alkyl benzene sulfonate, an ammonium dialkyl sulfosuccinate, and the like, and the monomer soluble initiator is replaced with from about 0.1% to about 1%, by weight, of a water-soluble initiator, such as an alkali metal persulfate, perborate or peracetate, ammonium persulfate, perborate, a urea peroxide, hydrogen peroxide, tertiary butyl hydroperoxide, and the like. If desired, a redox initiator system, such as ammonium persulfate and sodium bisulfite, or hydrogen peroxide and ascorbic acid, can also be used as the initiator. Polymerization is carried out at similar temperatures and over similar times as those used in suspension polymerization.

If bulk polymerization is employed, the monomers serve as the solvent and are polymerized in the presence of the above-described amounts of the monomer-soluble catalysts under the same general temperature and time conditions described above in connection with suspension and emulsion polymerization.

If solution polymerization is employed, the monomers are polymerized in the presence of at least one inert organic solvent, such as butane, pentane, octane, benzene, toluene, cyclohexanone, acetone, isopropanol, tetrahydrofuran, or the like. The selected initiator should be soluble in the reaction medium. The copolymer can either remain dissolved in the solvent at the end of the polymerization or can be precipitated from the liquid phase during the polymerization. In the former case, the product can be recovered by evaporation of the solvent or by precipitation of the polymer solution by combining it with a non-solvent for the product. The same general reaction conditions used in suspension and emulsion polymerization can be used.

The internally plasticized resin, once isolated from the desired polymerization reaction medium, can then be blended with effective amounts of the various other additives that are needed to yield the type of film forming compositions desired for use in making vapor barrier films.

It is generally desirable for the compositions to contain an amount of filler which is effective in maintaining the desirable properties of the product while at the same time reducing the need for larger amounts of the other components. Such fillers are added in finely divided form to the compositions in the weight amounts described above. Some representative fillers include talc, calcium carbonate, mica, and clay.

The film forming compositions of the present invention also contain an effective amount of at least one flame retardant to aid in giving the composition good flame retardancy and low smoke generation characteristics. The weight range described above for this component (1%–15%, by weight of the composition) is representative, and this component is preferably added in finely divided form, as well. Some examples of suitable flame retardants are: antimony trioxide (such as, THERMOGUARD B, from M and T chemicals); magnesium hydroxide (such as, S/G 84 from the Burns and Russell Co.); zinc borate (such as ZB-112, from Humphrey Chemical Corp.); hydrated alumina; aluminum oxide; and the like.

The film forming compositions of the present invention also desirably contain other functional additives which aid in giving the compositions of the present invention the most desirable characteristics. Examples include such well known additives as: heat and ultraviolet stabilizers, lubricants, processing aids, pigments, such as titanium dioxide, and the like.

Representative heat and ultraviolet stabilizers, which may be present at from about 2% to about 10%, by weight of the composition, include octyl epoxy tallate, epoxidized soyabean oil, barium-cadmium-zinc complex salts, organic phosphates, and tin and lead containing compounds.

Representative lubricants, which can be present at from about 1% to about 7%, by weight of the composition, include stearic acid, calcium stearate, polyethylene and stearamide lubricants.

Representative processing aids, which can be present at about 3% to about 25%, by weight of the composition include powdery acrylonitrile-butadiene rubber, chlorinated wax, chlorinated polyethylene, thermoplastic polyurethane, and the like.

The various components of the film formulation after being combined, can be processed on any conventional mixing apparatus at a sufficiently elevated temperature (e.g., 150° C. to 175° C.) and then formed into film products which are useful as vapor barrier films using such well known fabrication techniques as calendering, extrusion casting, extrusion blow molding, and solvent casting.

(COMPARATIVE) EXAMPLE 1

This Example illustrates the formation of a prior art vapor barrier film containing an externally plasticized polyvinyl chloride resin. The following ingredients were used:

|  | Amount | |
| --- | --- | --- |
| Ingredient | Parts by Weight | % |
| PVC homopolymer resin (SCC-616 from Stauffer Chemical Company) | 80.58 | 42.98 |
| PVC homopolymer resin (SCC-676 from Stauffer Chemical Company) | 19.42 | 10.36 |
| Isodecyl diphenyl phosphate plasticizer | 32.78 | 17.49 |
| Titanium dioxide pigment | 14.60 | 7.79 |
| Epoxidized octyl tallate | 10.21 | 5.45 |
| Antimony oxide flame retardant | 9.10 | 4.87 |
| Magnesium hydroxide filler/flame retardant | 8.06 | 4.30 |
| Zinc borate flame retardant | 8.02 | 4.28 |
| Ba/Cd heat stabilizer | 1.95 | 1.04 |
| Phosphite chelator | 1.95 | 1.04 |
| Stearic acid lubricant | 0.37 | 0.20 |
| Calcium stearate lubricant | 0.37 | 0.20 |

The formulation formed from mixing the above-described ingredients was processed on a two-roll mill at a temperature of from about 165.6° C. to prepare appropriate specimens for physical property measurements (as set forth in Example 7).

EXAMPLES 2–6

These Examples illustrate the formation of five different embodiments of the present invention which contain an internally plasticized resin as the major polymer component or components rather than the externally plasticized resin of Example 1. The abbreviation "pbw" and "%" stand for "parts by weight" and "percentage" (based on the weight of the entire formulation), respectively.

|  | Example No. | | | | | | | | | |
|---|---|---|---|---|---|---|---|---|---|---|
|  | 2 | | 3 | | 4 | | 5 | | 6 | |
| Ingredients | pbw | % | pbw | % | pbw | % | pbw | % | pbw | % |
| Internally plasticized resin* | 100.0 | 64.1 | 100.0 | 61.65 | 100.0 | 61.46 | 100.0 | 61.46 | — | — |
| Titanium dioxide | 14.5 | 9.3 | 14.5 | 8.94 | 14.5 | 8.92 | — | — | 100.0 | 61.46 |
| Epoxidized octyl tallate | 11.3 | 7.25 | 7.5 | 4.63 | 8.0 | 4.92 | 14.5 | 8.92 | 14.5 | 8.92 |
| Acrylonitrile-butadiene rubber | — | — | 10.0 | 6.17 | — | — | — | — | 10.0 | 6.15 |
| Internally plasticized resin** | — | — | — | — | 10.0 | 6.15 | 9.0 | 5.53 | 9.0 | 5.53 |
| Antimony oxide | 9.0 | 5.77 | 9.0 | 5.55 | 9.0 | 5.53 | 8.1 | 4.98 | 8.1 | 4.98 |
| Zinc borate | 8.1 | 5.19 | 8.1 | 4.99 | 8.1 | 4.98 | 8.1 | 4.98 | 8.1 | 4.98 |
| Magnesium hydroxide | 8.1 | 5.19 | 8.1 | 4.99 | 8.1 | 4.98 | 8.0 | 4.92 | 8.0 | 4.92 |
| Tin mercaptide heat stabilizer | 3.0 | 1.92 | 3.0 | 1.85 | 3.0 | 1.84 | 3.0 | 1.84 | 3.0 | 1.84 |
| Partially oxidized polyethylene | 1.0 | 0.64 | 1.0 | 0.62 | 1.0 | 0.61 | 1.0 | 0.61 | 1.0 | 0.61 |
| Bisstearamide lubricant | 1.0 | 0.64 | 1.0 | 0.62 | 1.0 | 0.61 | 1.0 | 0.61 | 1.0 | 0.61 |

*a suspension grade terpolymer having a relative viscosity of about 2.72 and containing about 73.6%, by weight, vinyl chloride, about 18.2%, by weight, 2-ethylhexyl acrylate, and about 8.2%, by weight, of bis(beta-chloroethyl)vinylphosphonate.
**a suspension grade terpolymer having a relative viscosity of about 2.9 and containing about 73.2%, by weight, vinyl chloride, about 19.4%, by weight, 2-ethylhexyl acrylate, and about 7.4%, by weight, bis(beta-chloroethyl)vinylphosphonate.
***a suspension grade terpolymer having a relative viscosity of about 2.9 and containing about 63.4%, by weight, vinyl chloride, about 27.4% 2-ethylhexyl acrylate, and about 9.2% bis-(beta-chloroethyl)vinylphosphonate.

Each of the above-described formulations was processed as described in Comparative Example 1 and appropriate test specimens were also formed as described in that Example.

EXAMPLE 7

The film products of Examples 1–6 were tested for various physical properties using a variety of standard test procedures. The Table given below sets forth the results:

|  | Film No. | | |
|---|---|---|---|
| Property | 1* | 2 | 3 |
| Clash-Berg Temp. (°C.) (38 mil film) | −13 | −12 | −7 |
| Graves Tear Str. (kg./m. × $10^{-2}$) | 53.19 | 36.06 | 53.37 |
| Tensile Str. at break (kg/cm$^2$) | 157.49 | 112.78 | 137.10 |
| Elongation at break (%) | 141 | 144 | 194 |
| Shore "A" Hardness (10 sec.) | 86 | 85 | 88 |

|  | Film No. | | |
|---|---|---|---|
| Property | 4 | 5 | 6 |
| Clash-Berg Temp. (°C.) (38 mil film) | −5 | −11 | −11 |
| Graves Tear Str. (kg./m. × $10^{-2}$) | 51.41 | 51.41 | 39.63 |
| Tensile Str. at break (kg/cm$^2$) | 146.17 | 138.23 | 115.31 |
| Elongation at break (%) | 104 | 132 | 110 |
| Shore "A" Hardness (10 sec.) | 91 | 88 | 92 |

*Prior art film.

The Clash-Berg temperature measures the end point of flexibility for the sample, as defined by Clash and Berg in their studies of low temperature flexibility. It is the temperature at which the apparent modulus of elasticity of the specimen is 9491.85 kg/cm$^2$. Lower temperature values indicate a greater degree of low temperature flexibility.

The Graves tear strength (ASTM D-1004) gives a measure of the force needed to tear a specimen 0.1 to 0.127 cm. in thickness. Higher values are indicative of a tougher, harder to tear film, and are desired.

The tensile strength at break is the maximum tensile stress sustained by a specimen during a tension test (ASTM D-882).

The percent elongation at break is a measure of the increase in length of the test specimen at the instant before rupture occurs (ASTM D-882). Percent elongation is expressed as the increase in distance between two gauge marks at rupture divided by the original distance between the marks, the quotient being multiplied by 100.

Shore "A" hardness is a measure of the indentation hardness of the specimen and is measured on the Shore "A" durometer after 10 seconds (ASTM D-2240). This instrument comprises a spring loaded indentor point with a load of 822 grams projecting through a hole in a presser foot. The device has a scale which indicates the degree of penetration into the plastic test specimen beyond the face of the foot. The scale ranges from 0 (for 0.254 cm. penetration) to 100 (for zero penetration).

When Film Nos. 1 and 2 were burned in the NBS smoke chamber under both the flaming and smoldering modes, the following results were obtained, with lower numbers being more desirable:

|  | Film No. | |
|---|---|---|
|  | 1* | 2 |
| Flaming Mode | | |
| Dm/gm of orig. sample | 46 | 35 |
| Dm/gm of material burned | 78 | 62 |
| Smoldering Mode | | |
| Dm/gm of orig. sample | 23 | 18 |
| Dm/gm of material burned | 52 | 35 |

*Prior art film

The NBS smoke chamber (see D. Gross, J. J. Loftus and A. F. Robertson, ASTM Special Technical Publication 422, pp. 166–204, 1969) contains a radiant heater which produces 2.5 W/cm$^2$ of heat at the surface of a 7.62 cm.×7.62 cm. sample, a propane-air pilot burner and a vertical beam of light with a photomultiplier tube detector and microphotometer to record the attenuation of light by smoke developing in the chamber. During smoke testing, the chamber is sealed to enclose the combustion products and smoke. The abbreviation "Dm/gm" represents the maximum smoke generated per unit weight of the sample. "Dm" is the maximum specific optical density and gives a measure of smoke buildup during the test. Lower numbers are desired as indicating less smoke: "Dm"=25, light smoke; 25–99, moderate smoke; 100–400, dense smoke; 400, very dense smoke.

EXAMPLE 8

Another film in accordance with the present invention was formulated from the following ingredients:

| Ingredients | Amount pbw | % |
|---|---|---|
| Internally plasticized resin* | 85 | 59.03 |
| Calcium carbonate filler | 30 | 20.83 |
| Acrylonitrile-butadiene rubber | 15 | 10.42 |
| Epoxidized octyl tallate | 5 | 3.47 |
| Titanium dioxide filler | 4 | 2.78 |
| Tin mercaptide | 3 | 2.09 |
| Partially oxidized polyethylene | 1 | 0.69 |
| Bisstearamide lubricant | 1 | 0.69 |

*a suspension grade terpolymer having a relative viscosity of about 2.72 and containing about 73.6%, by weight, vinyl chloride, about 18.2%, by weight, 2-ethylhexyl acrylate, and about 8.2%, by weight, bis-(beta-chloroethyl)vinylphosphonate.

The film sample was formulated as described in Comparative Example 1 and was tested against the prior art film of Example 1 for water vapor transmission and permeance in accordance with ASTM E-96-6, Method A. The following results were obtained for both films, which were 6 mils thick, with lower values being more desirable:

| | Film from Example No. | |
|---|---|---|
| | 1* | 8 |
| Water vapor trans (gm/m² in 24 hours) | 6.35 | 3.78 |
| Permeance (U.S. perms) | 0.92 | 0.54 |

*Prior art film.

EXAMPLE 9

This Example shows the physical properties for a series of films having a thickness of 3–4 mils with the exception of the Clash-Berg point which was determined on a 38 mil sample.

Film No. 1 was formed from the same ingredients (in the same amounts) as listed in Comparative Example 1 and represents a prior art film.

Film No. 2, in accordance with the present invention, was formed from the same ingredients (in the same amounts) as listed in Example 4 except that the concentration of epoxidized octyl tallate was increased from about 4.9%, by weight, to about 6%, by weight, in order to lower the Clash-Berg point.

Film No. 3, in accordance with the present invention, was formed from the same ingredients (in the same amounts) as listed in Example No. 5.

The following physical properties were noted:

| | Film No. | | |
|---|---|---|---|
| Property | 1* | 2 | 3 |
| Tensile str. at break (kg/cm²) | 179.89 | 192.44 | 182.81 |
| Graves tear str. (kg./m. × 10⁻²) | 46.23 | 48.73 | 49.62 |
| Water vapor trans. (gm/m² in 24 hrs.) | 11.31 | 7.4 | 6.09 |
| Permeance (U.S. Perms) | 1.63 | 1.06 | 0.88 |
| Clash-Berg Point (°C.) | −13 | −11 | −11 |

*Prior art film.

The physical property characteristics of films formed from the compositions of the present invention will vary somewhat depending, for example, upon the chemical ingredients which are used in the compositions and the type of fabrication equipment that is used to form the film. However, the following represent typical physical properties which would be obtained using the analytical tests reported in the Examples in this specification:

| Physical Property | Value(s) |
|---|---|
| Tensile Strength | 100 to 250 kg/cm² |
| Tear Strength | 30 to 65 kg/m. × 10⁻² |
| Shore "A" Hardness | 77 to 95 |
| Permeability | Max of 1.2 (U.S. perms) |
| Clash-Berg Temperature | 0° to −25° C. |
| NBS Smoke Dm/gm (smoldering) | 15 to 40 |
| NBS Smoke Dm/gm (flaming) | 30 to 60 |
| LOI* | 29 to 31 |

*Limiting Oxygen Index, ASTM D-2863. This is a measure of the minimum percentage concentration of oxygen in an oxygen-nitrogen mixture which permits the sample to burn.

The foregoing Examples illustrate certain preferred embodiments of the claimed invention but should not be construed in a limiting sense. The scope of protection that is sought is set forth in the claims which follow.

What is claimed:

1. In combination, a building and a vapor barrier film containing a polymeric component therein, the vapor barrier film being useful in retarding the transmission of water vapor therethrough and comprising an internally plasticized vinyl chloride copolymer resin as the predominant ingredient in the polymeric component of the vapor barrier film, said vinyl chloride copolymer resin also containing a $C_6$-$C_{10}$ alkyl acrylate and a bis(hydrocarbyl)vinyl phosphonate.

2. A combination as claimed in claim 1 wherein the internally plasticized copolymer resin is present at from about 40% to about 70% by weight of the vapor barrier film.

3. A combination as claimed in either claim 1 or 2 wherein the internally plasticized copolymer resin comprises from about 50% to about 85% by weight of vinyl chloride, from about 3% to about 47%, by weight, of a $C_6$-$C_{10}$ alkyl acrylate, and from about 47% to about 3%, by weight, of a bis(hydrocarbyl)vinylphosphonate.

4. A combination as claimed in either claim 1 or 2, wherein the internally plasticized copolymer resin comprises from about 55% to about 80%, by weight, of vinyl chloride, from about 10% to about 35% by weight, of a $C_6$-$C_{10}$ alkyl acrylate, and from about 25% to about 5%, by weight, of a bis(hydrocarbyl)vinylphosphonate.

5. A combination as claimed in either claim 3 or 4, wherein the vinylphosphonate is selected from the group consisting of bis(beta-chloroethyl)vinylphosphonate and bis(2-ethylhexyl)vinylphosphonate.

6. A combination as claimed in either claim 1 or 2, wherein the internally plasticized copolymer resin comprises from about 73% to about 75%, by weight, vinyl chloride, from about 17% to about 19%, by weight, of a $C_6$-$C_{10}$ alkyl acrylate, and from about 7% to about 9%, by weight, of bis(beta-chloroethyl)vinylphosphonate.

* * * * *

UNITED STATES PATENT AND TRADEMARK OFFICE
CERTIFICATE OF CORRECTION

PATENT NO. : 4,560,618

DATED : December 24, 1985

INVENTOR(S) : Jagadish C. Goswami

It is certified that error appears in the above—identified patent and that said Letters Patent is hereby corrected as shown below:

Col. 1, line 48, "3,972,041" should read -- 3,872,041 --;

Col. 1, line 56, "completion" should read -- composition --;

Col. 3, line 8, "interferring" should read -- interfering --;

Col. 5, line 56, "chemicals" after "M and T" should read -- Chemicals --;

Col. 10, line 21, The expression "kg/m. x $10^{-2}$" should appear after "Tear Strength" in the table rather than after "30 to 65".

UNITED STATES PATENT AND TRADEMARK OFFICE
CERTIFICATE OF CORRECTION

PATENT NO. : 4,560,618

DATED : December 24, 1985

INVENTOR(S) : Jagadish C. Goswami

It is certified that error appears in the above—identified patent and that said Letters Patent is hereby corrected as shown below:

Cols. 7 and 8, the tabular listing for Tables 5 and 6 should appear as follows:

| Ingredients | 5 | | 6 | |
|---|---|---|---|---|
| | pbw | % | pbw | % |
| Internally plasticized resin* | 100.0 | 61.46 | --- | --- |
| Internally plasticized resin** | --- | --- | 100.0 | 61.46 |
| Titanium dioxide | 14.5 | 8.92 | 14.5 | 8.92 |
| Internally plasticized resin*** | --- | --- | 10.0 | 6.15 |
| Chlorinated wax | 10.0 | 6.15 | --- | --- |
| Antimony oxide | 9.0 | 5.53 | 9.0 | 5.53 |
| Magnesium hydroxide | 8.1 | 4.98 | 8.1 | 4.98 |
| Zinc borate | 8.1 | 4.98 | 8.1 | 4.98 |
| Epoxidized octyl tallate | 8.0 | 4.92 | 8.0 | 4.92 |
| Tin mercaptide | 3.0 | 1.84 | 3.0 | 1.84 |
| Partially oxidized polyethylene | 1.0 | 0.61 | 1.0 | 0.61 |
| Bisstearamide lubricant | 1.0 | 0.61 | 1.0 | 0.61 |

Signed and Sealed this

First Day of April 1986

[SEAL]

Attest:

DONALD J. QUIGG

Attesting Officer

Commissioner of Patents and Trademarks